United States Patent [19]

Gechele et al.

[11] 3,787,875

[45] Jan. 22, 1974

[54] MACHINE FOR RECORDING VISUALLY INTERPRETABLE DATA AND MACHINE READABLE INFORMATION ON A TICKET

[75] Inventors: Walter Gechele, Cascinette; Bruno Piazza, Ivrea, both of Italy

[73] Assignee: Ing. C. Olivetti & Co., S.p.A., Ivrea, Turin, Italy

[22] Filed: Nov. 18, 1971

[21] Appl. No.: 199,968

[30] Foreign Application Priority Data

Nov. 24, 1970 Italy .................................. 70917/70

[52] U.S. Cl. ...................... 346/74 MP, 101/DIG. 15

[51] Int. Cl. ............................................ B41f 17/00

[58] Field of Search ...........340/174.1 G; 346/74 M, 346/74 MP; 235/61.12 M; 101/DIG. 15

[56] References Cited

UNITED STATES PATENTS 3,343,482 9/1967 Scott et al. ..................... 346/74 MP 2,438,952 5/1960 Roggenstein .................. 346/74 MP

*Primary Examiner*—Vincent P. Canney

[57] ABSTRACT

A ticket printing and recording machine prints rows of characters on a first portion of the ticket and magnetically records information corresponding to said characters on a second portion of the ticket. The printing device comprises a plurality of sets of typewheels mounted on a corresponding plurality of common shafts. The shafts are mounted on a support rotatable for causing each set of typewheels to print a corresponding row of characters. The recording device comprises a rotatable magnetic head and is operated in the interval of time comprised between the printing operations of two groups of characters, while the ticket is locked by a flange opposite to the head and by a rod entering a hole of the ticket.

6 Claims, 5 Drawing Figures

INVENTORS
WALTER GECHELE
BRUNO PIAZZA

*INVENTORS*
WALTER GECHELE
BRUNO PIAZZA

INVENTORS
WALTER GECHELE
BRUNO PIAZZA

MACHINE FOR RECORDING VISUALLY INTERPRETABLE DATA AND MACHINE READABLE INFORMATION ON A TICKET

BACKGROUND OF THE INVENTION

This invention relates to a ticket printing and recording machine for printing visually interpretable data on a first portion of the ticket and for recording non-visually interpretable information corresponding to said data on a second portion of said ticket, comprising a printing device actuatable for printing said data in a printing station in a plurality of groups of characters, said groups being printed at different instances, a recording device actuatable for recording said information and control means for controlling the operation of said printing device and said recording device.

There are known ticket printing machines, where the tickets are connected to each other so as to form a strip and where the same numeric information is printed and magnetically recorded on tbe opposite sides of each ticket. The printing and the magnetic recording of the information on both sides of the ticket is effected in a different printing station and in a recording station, respectively. The two stations have the disadvantage that, if the information is recorded in an erroneous manner on one side of the ticket incidental to a misfunction of the magnetic recording unit, all tickets comprised between the printing station and the magnetic recording station are erroneously recorded.

SUMMARY OF THE INVENTION

This disadvantage is obviated by the ticket printing and recording machine according to the invention, wherein the improvement comprises mounting means for mounting said recording device adjacent to said printing station, and actuating means actuating said recording device in the interval of time comprised between the printing operation of two subsequent groups of characters.

BRIEF DESCRIPTION OF THE DRAWING

This characteristic of the invention will become apparent from the following description of a preferred embodiment made by way of example and not in a limiting sense, with reference to the accompanying drawing, wherein.

DESCRIPTION OF A PREFERRED EMBODIMENT

Figure 2:
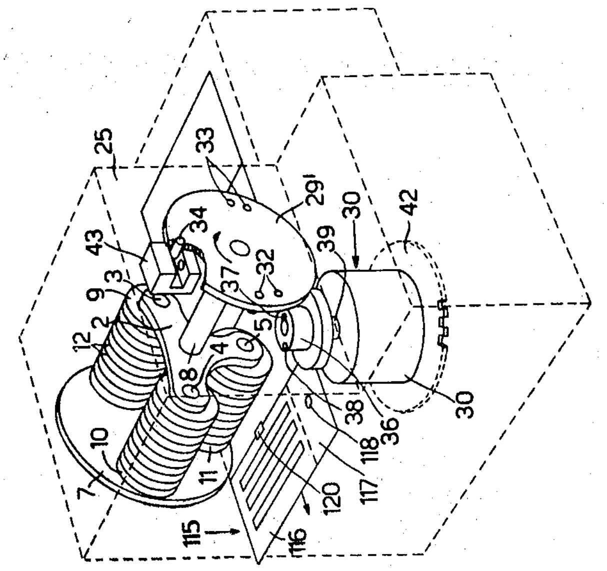
FIG. 2 is a partial perspective view of the machine of FIG. 1.
Figure 1:
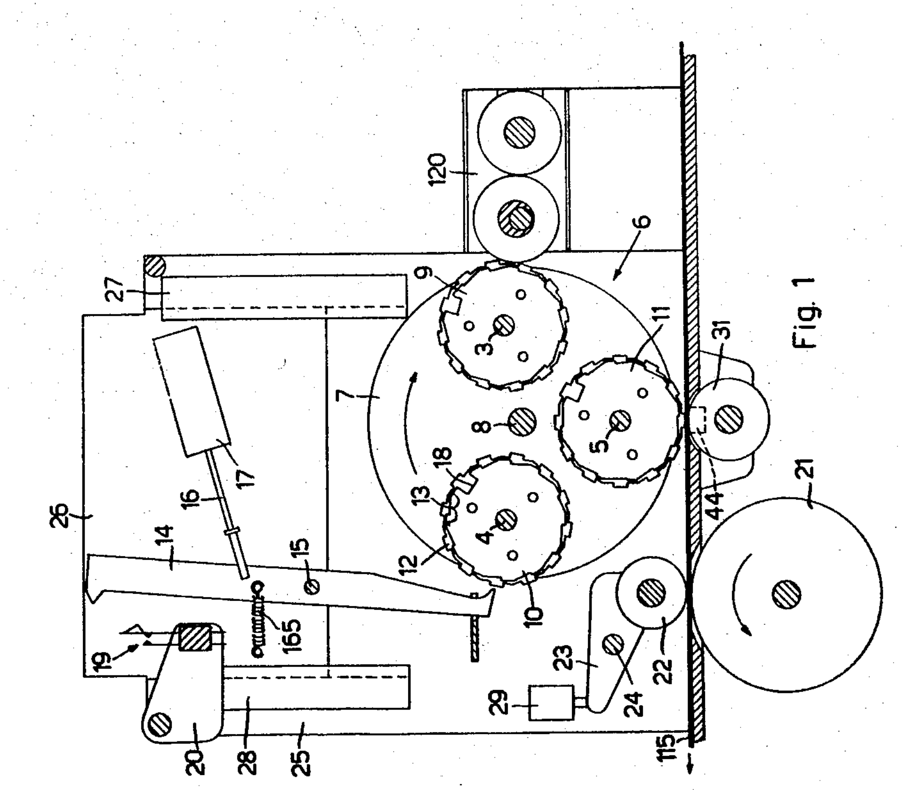
FIG. 1 is a front view of a ticket printing and recording machine according to the invention.

With reference to FIG. 1, the ticket printing machine comprises a printing device formed of a rotatable support generically indicated by the numeral 6. The support 6 comprises a disk 7 secured to a horizontal shaft 8 rotatable on the machine frame 25. The shaft 8 is continuously rotated by means of an electric motor not shown in the drawing. Mounted on the support 6 there are three printing units 9,10,11, each one adapted to print a corresponding row of characters on a ticket 115 (FIG. 2). More particularly, secured to the shaft 8 is also a three armed plate 2, which is also connected to the disk 7 by means of three shafts 3,4,5, each one carrying a corresponding printing unit 9,10,11. The three shafts 3,4,5 are circumferentially located around the shaft 8. The angular distance between the shafts 3 and 4 is 160°, whereas the angular distance between the shafts 4 and 5, as well as that between the shafts 5 and 3 is 100°. Each printing unit 9,10 or 11 is formed of 10 type wheels 12, each one comprising 12 alphanumeric characters.

Each typewheel 12 is provided with twelve teeth 13 (FIG. 1) in correspondence with the alphanumeric characters. The typewheels 12 of one printing unit 9,10,11 are presettable with a set of selection pawls 14 fulcrumed on a horizontal shaft 15 and each one connected to an electromagnet 17 by means of a pull rod 16. Therefore the machine comprises ten pawls 14, 10 pull rods 16 and 10 electromagnets 17.

Each typewheel 12 also comprises a recess 18 in correspondence of a specific angular position of the typewheel 12. When the recess 18 is located in correspondence with the pawl 14, this latter is caused to effect an additional counterclockwise rotation, since the recess 18 is deeper than the recesses between the teeth 13. Owing to this rotation the pawl 14 actuates a corresponding microswitch 19, secured to the machine frame 25 by means of a support 20. Each microswitch 19 is connected to the corresponding electromagnet 17, to energize this latter when actuated by the pawl 14.

The 10 pawls 14, the 10 pull rods 16 and the 10 electromagnets 17 are mounted on a support 26 which is slidable vertically with respect to the frame 25, on vertical guides 27 and 28, under the control of the electric motor and through known linkages not shown in the drawing.

Furthermore, the machine comprises an inking device 120, the operation of which is known per se, and a device for feeding the tickets 115. The feeding device is formed of a driving roller 21 cooperating with a friction roller 22 in a known manner. The roller 22 may be displaced vertically by a lever 23 fulcrumed on a shaft 24 secured to the machine frame 25, when an electromagnet 29 mounted on the machine frame 25 is energized.

Secured to the shaft 8 is also a disk 29 (FIG. 2), carrying assembled two pairs of pins 32 and 33 associated with the printing units 9 and 10 and a single pin 34 associated with the printing unit 11. More particularly, the pair of pins 32 is located diametrally opposite to the unit 9, the pair 33 is opposite to the unit 10 and the pin 34 is substantially opposite to the unit 11. During the rotation of the disk 29 the pins 32, 33 and 34 cooperate with a photocell 43, secured to the machine frame 25. The photocell 43 is located on a vertical plane passing through the shaft 8. A printing roller 31 is located diametrally opposite to the photocell 43 and forms the printing station of the machine. Another photocell 44 (FIG. 1) is located on the same vertical plane adjacent to the roller 31.

Figure 3:
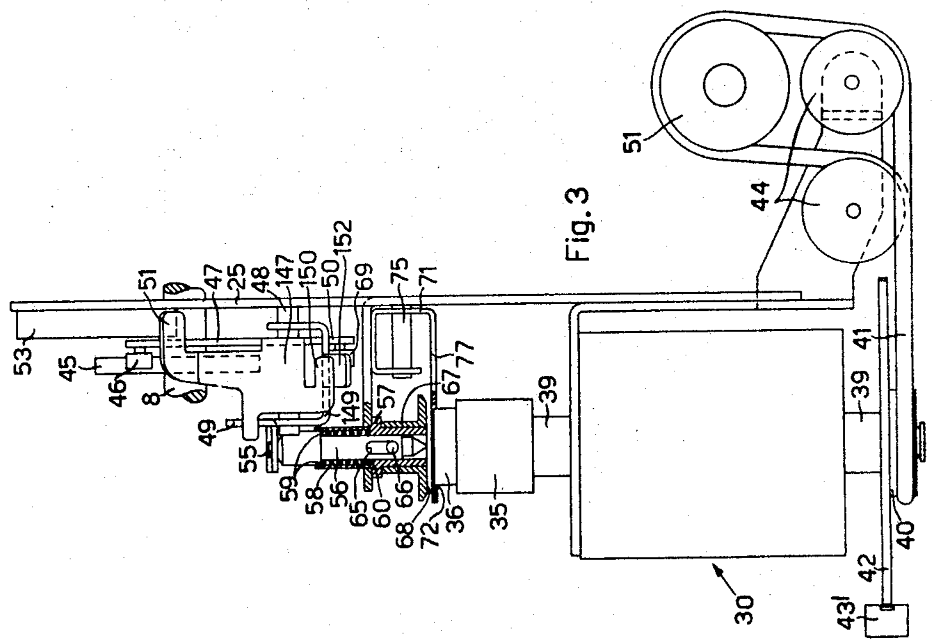
FIG. 3 is a front view of the magnetic recording device of the machine of FIG. 1.

The machine comprises also a magnetic recording device 30 (FIG. 2) located adjacent to the printing device and transversely aligned with the printing roller 31. The recording device comprises a cylindrical block 35 (FIG. 3) secured to a rotatable vertical shaft 39. A pulley 30 secured to the shaft 39 is connected to a further pulley 51 by means of a belt 41 and another pulley 44. This latter is cyclically rotated by tbe electric motor of the machine in a known manner.

Housed on the upper end 36 of block 35 are two recording magnetic heads 37 and 38 (FIG. 2) located at different distances from the shaft 39. Secured to the lower end of the shaft 39 is a toothed disk 42 (FIG. 2), which cooperates with a pulse generator 43, which is adapted to generate a pulse at the passage of each tooth of the disk 42. To this end the generator 43 is responsive to the variations of reluctance caused by the alternation of the teeth and the recesses passing past the generator 43′ incidental to the rotation of the disk 42, in a known manner.

Figure 4:
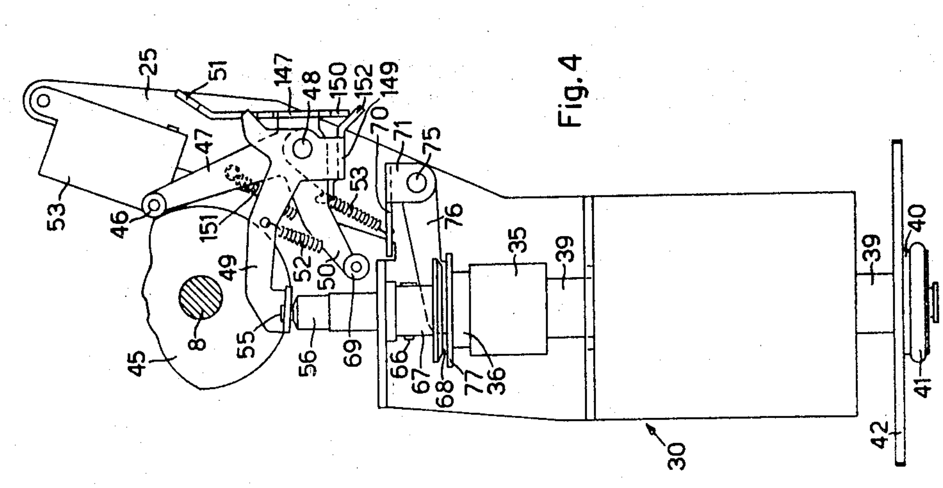
FIG. 4 is a side view of the magnetic recording device of FIG. 3.

The machine comprises also control means for the printing units 9,10,11 and for the magnetic recording device 30. More particularly, the control means comprise a cam 45 secured to the shaft 8. Secured to the frame 25 is a shaft 48 (FIG. 4) fulcruming an arm 47, which is urged by a spring 151 to cause a roller 46 to contact the cam 45. The arm 47 is a part of a lever 147 having a second arm 50 provided with a roller 69 cooperating with an end 70 of a bail 71. This latter is fulcrumed on a pin 75 secured to the machine frame 25. A spring 53 is tensioned between the bail 71 and the arm 50 and is extended when the roller 69 engages the ball 71. Therefore, the spring 53 is adapted to restore the bail 71 to the position shown in FIG. 4, when the arm 50 no longer engages the bail 71. The bail 71 is also provided with an arm 76 integral with a metal plate 77 provided with a hole 72, normally housing the head 36 of the recording device 30. The lever 147 is also provided with another arm 51 adapted to cooperate with a microswitch 53, which controls the magnetic recording device 30 in the manner described hereinafter.

An arm 49 of another bail 149 fulcrumed on the shaft 48 is provided with a lug 55 adapted to cooperate with the upper end of a vertical rod 56, slidable into a stationary sleeve 57. The bail 149 is provided with a lug 152 normally urged by a spring 52 to contact a projection 150 (FIG. 3) of the lever 147. The spring 52 forms thus a yieldable means adapted to cause the lever 47 to positively remove the arm 49 from the head 56 and to yieldably move the arm 49 toward the head 56.

Housed between a shoulder 59 of the rod 56 and a shoulder 60 of the sleeve 57 is a compression spring 58 urging the rod 56 upwards. The rod 56 is provided with a slot 65 which cooperates with a pin 66 connected to a second sleeve 67 sliding on the external surface of the sleeve 57. The sleeve is provided with a flange 68 adapted to engage the upper surface of the ticket 115, but normally removed by said surface by the urge of the spring 58.

Finally the machine comprises an electronic control unit 120 (FIG. 5), comprising a storage 80 connected to a central computer 130 and adapted to store the data to be printed and the information to be recorded on the ticket 115. The storage 80 comprises three registers 81,82,83, the register 81 storing the data to be printed, the register 82 storing the information to be recorded and the register 83 storing the number of tickets to be printed and recorded with the data and information of the registers 81 and 82.

The register 83 is connected to a comparing circuit 161. A microswitch 105 mounted on the machine frame 25 is adapted to generate a signal, at each revolution of the disk 7. This signal is sent to a pulse counter 160, which is rendered ineffective each time an error indicating device 90 indicates, in a known manner, that a ticket has been erroneously recorded. The counter 160 is connected to the comparing circuit 161, which is adapted to compare the contents of the register 83 and that of the counter 160. The output of the circuit 161 is connected by means of a lead 54 to a control circuit of the electric motor of the machine, and by means of a lead 84 is conected to a control circuit of the conventional cutting blade, provided for cutting the printed tickets 115 and not shown in the drawing.

The register 82 of the storage 80 is connected by means of a lead 122 to a recording control circuit 184 for the magnetic recording device 30. The recording circuit 184 comprises two identical recording circuits connected to recording head 37 and 38 (FIG. 2). The recording circuit connected to the head 37 comprises a signal modulator 85 in turn connected to a signal comparator 88. The comparator 88 is connected to the head 37 by a lead 89.

Figure 5:
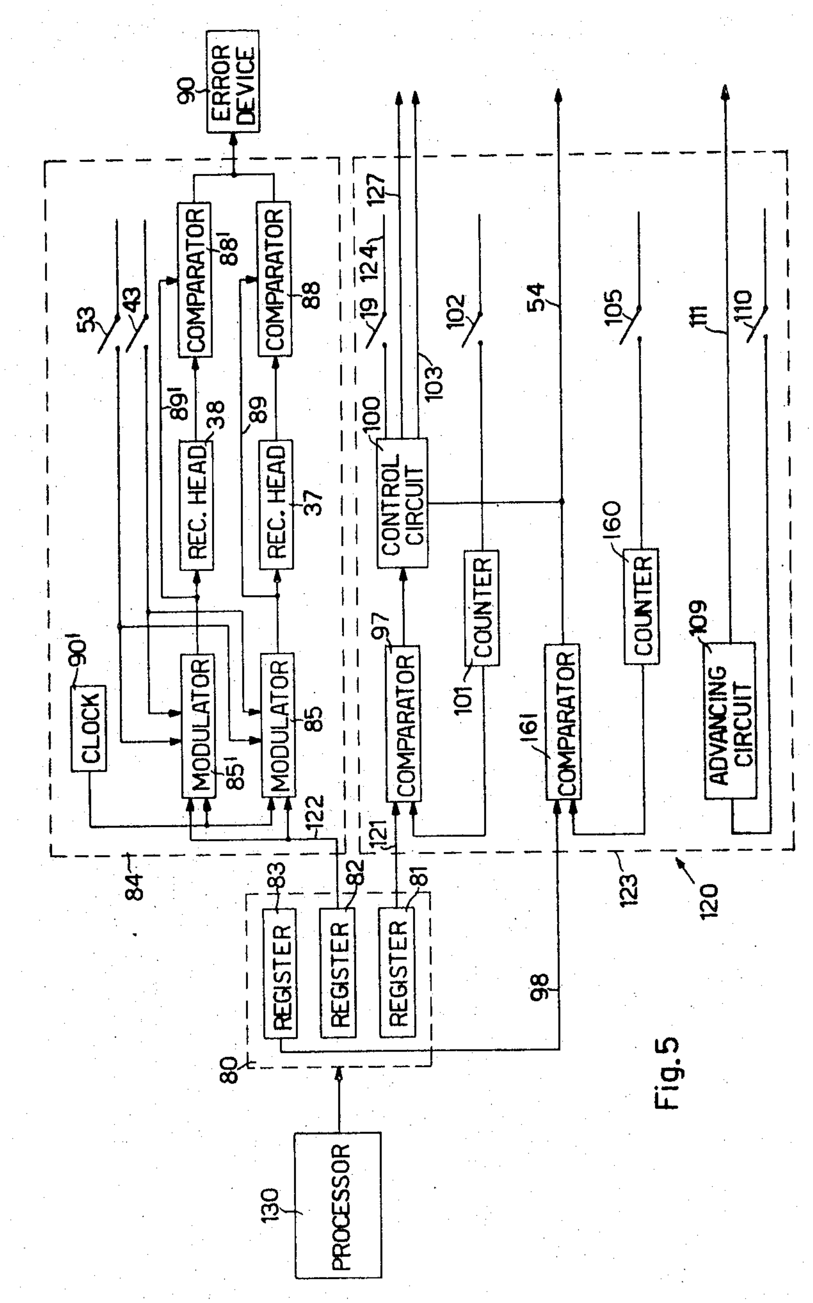
FIG. 5 is a block diagram of the electronic control unit of the machine of FIG. 1.

The corresponding circuits associated with the head 38 are indicated in FIG. 5 respectively by the numerals 85′, 88′, 89′ and are identical to those of the head 37. The circuits 85 respectively 85′, and 89 respectively 89′ are of a known type and therefore are not described in detail. The outputs of the comparators 88 and 88′ are connected to the error indicating device 90. The modulators 85 and 85′ of the two recording circuits 86, 86′ are controlled by the timer 43′, and a clock circuit 190 in a manner to be described.

Furthermore, the register 81 of the storage 80 is connected to a printing control unit 123. This latter comprises a type selecting circuit 100 adapted to select the type of the typewheels 12 in a manner hereinafter described. The circuit 100 is connected through a lead 124 to the 10 microswitches 19 (FIGS. 1 and 5) and through a lead 125 to a comparing circuit 97. The inputs of the comparing circuit 97 are connected to the outputs of the register 81 and of a pulse counter 101. This latter is actuated by a microswitch 102, mounted on the machine frame 25 and supplying a signal at each vertical stroke of the support 26.

The circuit 100 is adapted to control through an output 127 the electromagnets 17 (FIG. 1) and through an output 103 the reciprocating motion of the support 26. Furthermore, the printing control unit 123 comprises a circuit 109 adapted to control via a lead 111 the electromagnet 29, for advancing the tickets. The circuit 109 is in turn actuated by a microswitch 110 operated in a known manner by the pulses emitted by either photocell 43 or 44.

Each ticket 115 (FIG. 2) comprises a first portion 116, where visually interpretable data are printed by the three printing units 9,10 and 11, and a second portion 117 coated with a layer of ferromagnetic material where non-visually interpretable information corresponding to the printed data magnetically recorded by means of the heads 37 and 38. The tickets 115 are connected to each other so as to form a continuous strip. Furthermore, provided in each ticket 115 is a pair of edge notches. The notches of two adjacent tickets 115 form a rectangular aperture 120. The latter, when in correspondence with the printing roller 31, is read by a photocell 44.

The ticket printing and recording machine operates as follows.

In response to the merchandises needed for being ticketed, the central processor 130 stores the data corresponding to the various tickets to be printed and recorded.

Then the central processor 130 transmits sequentially to the storage 80 of the machine the numeric values to be printed and recorded on each ticket and the number of tickets requested. More particularly, these numeric values are stored in the registers 81, 82 and 83.

Thereafter, under the control of the photocell 43 (FIG. 2) the support 6 (FIG. 1) is rotated to bring the printing unit 9 in front of the pawls 14 in a manner known per se. Now the control circuit 100 through the lead 103 operates the reciprocating mechanism of the support 26, whereby this latter is first moved downwards and then upwards. Furthermore, the circuit 100 through the lead 127 deenergizes the electromagnets 17, whereby a spring 165 causes the pawls 14 to be yieldably rocked counterclockwise and to engage the recesses of the teeth 13 of the typewheels 12 of the unit 9. The typewheels 12 are now rotated counterclockwise one step at each downward stroke of the support 26.

When a pawl 14 engages the recess 18 of each typewheel 12, it is additionally rocked whereby it actuates the corresponding microswitch 19. This latter in turn energizes the corresponding electromagnet 17, thus causing the pull rod 16 to rotate clockwise the pawl 14, which disengages now the teeth of the corresponding typewheel 12.

When all electromagnets 17 are energized, all typewheels 12 of the printing unit 9 are located in the starting position. Thereafter a coincidence circuit, not shown in the drawing, causes all the electromagnets 17 to be deenergized, thus allowing the pawls 14 to engage again the teeth 13. The typewheels 12 are now rotated step by step at each reciprocating movement of the support 26. The microswitch 102 is now conditioned to increase one unit the contents of the counter 101, which thus represents the type selected in all the typewheels 12 of the unit 9. During each upward stroke of the support 26 the comparator 97 compares for each typewheel 12 the contents of the counter 101 with the character stored in the register 81.

When the contents of the counter 101 is equal to that stored in the register 81 for the individual typewheel 12, the comparator 97 generates a signal, which through output 125 is sent to the circuit 100. This latter causes now the corresponding electromagnet 17 to be energized, whereby the corresponding pawl 14 disengages the teeth of the corresponding typewheel 12, which has so selected the type according to the data stored in the register 81 and will no longer rotate during the subsequent reciprocating movement of the support 26. The various typewheels 12 are arrested each one according to the relevant data of the register 81, whereby the type selection is simultaneously carried out for all typewheels 12 of the unit 9. When all the typewheels 12 have been so arrested, a coincidence circuit causes the support 6 to be rotated under the control of the photocell 43, to locate first the print unit 10 in front of the pawls 14, thus selecting the types of the typewheels 12 of the unit 10 in a similar manner. Thereafter the types of the typewheels 12 of the printing unit 11 are selected in the same way, whereby the machine is ready for printing the tickets 115.

Now the circuit 100 through the lead 98 causes the support 6 to rotate continuously clockwise together with the disk 29. When the first pin of the pair of pins 32 corresponding to the unit 9 is sensed by the photocell 43, the typewheels 12 are brought in front of the printing roller 31. The photocell 43 controls now the microswitch 110, which in turn energizes the electromagnet 29 of the roller 22, thus pressing the strip of tickets 115 against the roller 22. This latter starts to feed the tickets 115 at a speed which is identical to the peripheral speed of the printing support 6, whereby the first row of characters is printed out on the portion 116 of the first ticket 115. When the second pin of the pair of pins 32 is sensed by the photocell 43, the microswitch 110 is open, whereby the electromagnet 29 is deenergized and the ticket 115 is stopped, while the support 6 continues to rotate.

The cam 45 (FIG. 4) rotating together with the support 6 causes now the spring 151 to rock the arm 47 counterclockwise, whereby the spring 52 causes the arm 49 to rock counterclockwise. The lug 55 of the arm 49 pushes now the rod 56 downwards compressing the spring 59. The rod 56 enters now the hole 118 of the ticket 115, thus centering it with respect to the rotating axis of the recording heads 37 and 38.

During the downward stroke of the rod 56, the upper edge of slot 65 of the rod 56 engages the pin 66 of the sleeve 67, whereby this latter is moved downwards. The flange 68 of the sleeve 67 presses now the ticket 115 against the upper end 36 of the block 35, housing the heads 37 and 38. Simultaneously the roller 69 of the arm 50 engages the end 70 of the bail 71, whereby the arm 76 pushes the plate 77 downwards. The end 36 enters thus the hole 72 of the plate 77.

After the plate 77 has been lowered, the arm 51, which is rocked bodily with the arm 47, effects a supplementary stroke with respect to the arm 49, whereby the arm 51 engages the microswitch 53. This microswitch 53 causes now the pulley 51 to be rotated and activates the modulators 85 and 85'. The block 85 is now rotated together with the toothed wheel 42. The information stored in the register 82 are modulated by the modulators 85 and 85' and sent to the recording heads 37 and 38 in synchronism with the signals generated by the timer 43'.

The two heads 37 and 38 thus record the information stored in the register 82 on two circular tracks of the portion 117 of the ticket 115 during full revolution of the block 35. During the subsequent revolution of the block 35, the two heads 37 and 38 read the information just recorded, which are compared by the comparators 88, 88', with the output signals of the modulators 85 and 85'. If no coincidence is found between the signals the comparators 88, 88' emits a signal which is simultaneously sent to the error indicating device and to the counter 161. This latter is thus prevented from counting whereas the device 90 invalidates the erroneously recorded ticket 115.

Thereafter the cam 45 restores the arm 47 clockwise. Concurrently also the arm 49 is rocked by the projection 152, whereby the ticket 115 is released from rod 56, which is moved upwards by the spring 59 together with the sleeve 67. In turn the arm 50 releases the bail 71 which is restored by the spring 53, whereby the plate 77 releases the block 35, and the ticket is removed from the heads 37 and 38. The transmission ratio of the pulley 40 and the motor of the machine is such as to cause two revolutions of the block 35 during 160° of rotation of the cam 45, so that during the period of time required by the support 6 for setting the unit 10 into the printing station, the recording device 30 records and checks the recorded information.

The wheel 29' has been now rotated 160° whereby the first pin of the pair of pins 33 engages the photocell 43. The strip of tickets 115 starts again to move in a manner similar to that above described, whereby the second row of characters is printed by the unit 10. The same operations are then effected for printing the third row of characters by means of the unit 11. However, during the interval between the printing of the second row and the third row the cam 45 does not affect the recording device 30. In order to print on tickets having variable length, the strip of tickets 115 is stopped after printing the third row of characters by the photocell 44 upon the transit of the aperture 120, which indicates the end of the ticket.

After each ticket 115 is printed, the microswitch 105 generates a signal, which is sent to the counter 161, which counts thus the number of printed tickets. When the contents of the register 83 and the contents of the counter 161 are equal, the comparing circuit 160 through the lead 54 causes the support 6 to be stopped and through the lead 84 causes the cutting blade located in correspondence with the printing station to sever the printed tickets 115 from the strip.

What we claim is:

1. A machine for recording visually readable data and machine readable information on a ticket, comprising:

a printing unit including a rotatable support, a plurality of groups of aligned individually settable type bearing members mounted on said rotatable support for being successively brought into and through a printing position and means for rotating said support;

means for individually positioning said type bearing members for setting them to print preselected information on said ticket at said printing position;

a recording device adjacent said printing position;

means synchronized with the passage of said successive groups of type bearing members through said printing position for incrementally transporting said ticket through the printing position for causing said successive groups of type bearing members to print on successive portions of the ticket during the incremental movements thereof; and means for controlling said recording device to record said machine readable information on said ticket during pauses between increments of movement of said ticket.

2. A ticket printing and recording machine for printing visually interpretable data on a first portion of the ticket and for machine readable information corresponding to said data on a second portion of said ticket, comprising:

a printing unit including a plurality of individually presettable typewheels, a plurality of shafts and a rotatable support, each of said shafts carrying a group of said typewheels and being mounted on said rotatable support at a predetermined mutual angular distance, said support being continuously rotatable for bringing the various sets of typewheels sequentially to a printing station, a magnetic recording head mounted adjacent to said printing station;

a cam mounted for rotation with said support;

a microswitch for actuating said recording head;

a cam follower cooperating with said cam for actuating said magnetic head in the interval of time between the printing operation of two subsequent groups of characters; and intermittently operable feeding means for causing said tickets to sequentially cross said printing station.

3. A machine according to claim 2, further comprising of control unit comprises a storage for storing the information to be recorded on said ticket, said microswitch when so operated, causing said storage to transfer said information to said recording device.

4. A machine according to claim 2, comprising a locking mechanism for locking said ticket in a predetermined position, a member reciprocable for operating said locking mechanism, yieldable means for connecting said cam follower and said member so as to cause said cam follower to positively remove said member from said mechanism and to yieldably move said member to said mechanism, whereby said cam follower can be moved by said cam after said member operates said mechanism.

5. A machine according to claim 4, wherein said second portion of the ticket has a circular shape around a hole, and wherein said locking mechanism comprises a rod axially movable by said member to enter said hole from the side opposite to said magnetic head, said rod being axially slidably in a sleeve, a flange secured to one end of said sleeve, and a last motion connecting means for causing said rod to displace said sleeve to bring said flange in contact with said ticket, while said rod enters said hole, whereby the ticket is locked between said flange and said magnetic head.

6. A machine according to claim 2, comprising a disk secured to said support, at least a pair of pins associated with one of said printing units, the pins of said pairs being secured on said disk in a position diametrically opposite with respect to the associated printing unit, sensing means for said pins, means for mounting said sensing means diametrically opposite to said printing station, and actuating means controlled by said sensing means upon sensing a first pin of each one of said pairs for rendering said actuating means effective and controlled by said sensing means upon sensing the second pin of each pair for rendering said actuating means ineffective, whereby said ticket is fed when the associated printing unit is passing through said printing station.

* * * * *